(12) United States Patent
Panciroli

(10) Patent No.: US 9,399,399 B2
(45) Date of Patent: Jul. 26, 2016

(54) METHOD FOR CONTROLLING AN INTERNAL COMBUSTION ENGINE

(71) Applicant: Magneti Marelli S.p.A., Corbetta (IT)

(72) Inventor: Marco Panciroli, Bologna (IT)

(73) Assignee: Magneti Marelli S.p.A., Corbetta (IT)

( * ) Notice: Subject to any disclaimer, the term of this patent is extended or adjusted under 35 U.S.C. 154(b) by 752 days.

(21) Appl. No.: 13/865,501

(22) Filed: Apr. 18, 2013

(65) Prior Publication Data

US 2013/0282257 A1   Oct. 24, 2013

(30) Foreign Application Priority Data

Apr. 19, 2012   (IT) .............................. BO2012A0216

(51) Int. Cl.
| | |
|---|---|
| *B60K 31/00* | (2006.01) |
| *F02D 41/04* | (2006.01) |
| *F02B 37/16* | (2006.01) |
| *F02D 23/00* | (2006.01) |
| *F02B 37/18* | (2006.01) |
| *F02M 35/10* | (2006.01) |

(52) U.S. Cl.
CPC .......... *B60K 31/0058* (2013.01); *F02D 41/045* (2013.01); *F02B 37/16* (2013.01); *F02B 37/18* (2013.01); *F02D 23/00* (2013.01); *F02D 2200/602* (2013.01); *F02D 2200/606* (2013.01); *F02M 35/10222* (2013.01)

(58) Field of Classification Search
CPC ..... F02D 11/10; F02D 11/105; F02D 11/106; F02D 29/04; F02D 41/10; F02D 2200/1002; F02D 2200/604; F02D 2200/606
See application file for complete search history.

(56) References Cited

U.S. PATENT DOCUMENTS

| | | | | |
|---|---|---|---|---|
| 6,718,255 | B1 * | 4/2004 | Okubo | ................. F02D 11/105 |
| | | | | 123/399 |
| 8,738,228 | B2 * | 5/2014 | Filev | ..................... B60W 50/08 |
| | | | | 701/36 |
| 2002/0165658 | A1 | 11/2002 | Ament | |
| 2006/0196183 | A1 | 9/2006 | Isogai | |
| 2007/0101977 | A1 | 5/2007 | Stewart | |
| 2008/0300768 | A1 | 12/2008 | Hijikata | |
| 2009/0069971 | A1 | 3/2009 | Asahara et al. | |

FOREIGN PATENT DOCUMENTS

| | | |
|---|---|---|
| DE | 10257061 A1 | 6/2004 |
| JP | 2004274879 A * | 9/2004 |

* cited by examiner

*Primary Examiner* — Erick Solis
*Assistant Examiner* — Anthony L Bacon
(74) *Attorney, Agent, or Firm* — Howard & Howard Attorneys PLLC

(57) ABSTRACT

A method for controlling an internal-combustion engine comprises steps of: determining a current value of a driving torque requested to the internal-combustion engine and a first time derivative of the current value of the driving torque; comparing the current value of the driving torque and first time derivative with first and second threshold values, respectively; determining a "sport driving" condition only if the current value of the driving torque is higher than the first threshold value and the first time derivative is higher than the second threshold value; and controlling the internal-combustion engine as a function of the "sport driving" condition.

11 Claims, 1 Drawing Sheet

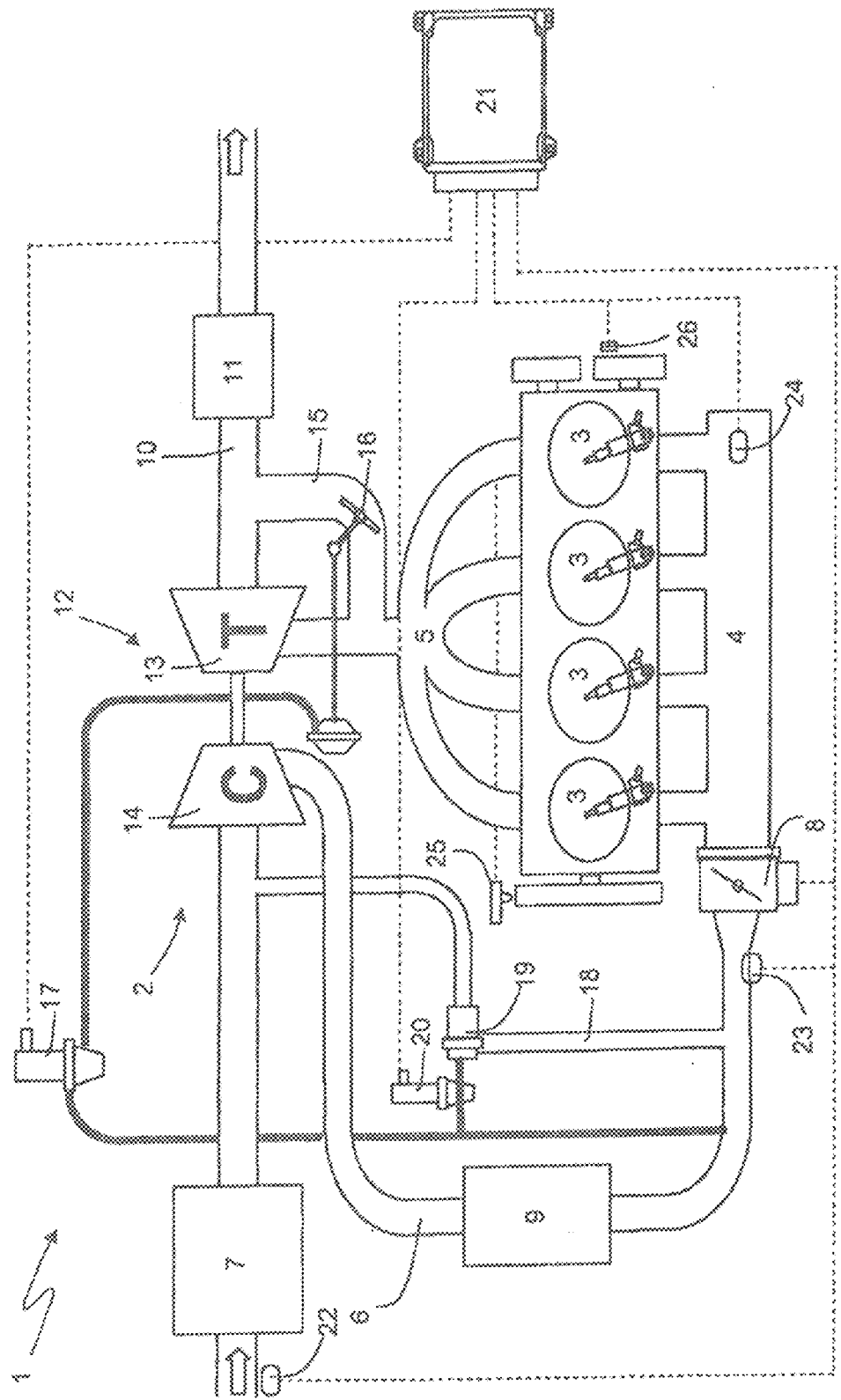

METHOD FOR CONTROLLING AN INTERNAL COMBUSTION ENGINE

REFERENCE TO RELATED APPLICATION

This application is based upon and claims priority to Italian Patent Application B302012A 000216 filed on Apr. 19, 2012.

BACKGROUND OF INVENTION

1. Field of Invention

The invention, in general, relates to a method for controlling an internal-combustion engine and, in particular, is advantageously, but not exclusively, applied in an internal-combustion engine provided with a turbocharger-supercharging system that is capable of increasing the power developed by the engine by using the enthalpy of the exhaust gases for compressing the air drawn by the engine and, thereby, increase the suction volumetric efficiency.

2. Description of Related Art

A turbocharger-supercharging system includes a turbocharger provided with a turbine (which is arranged along an exhaust conduit to rotate at a high speed under the action of the exhaust gases ejected by the engine) and with a compressor (which is rotated by the turbine and is arranged along the air-feeding conduit for compressing the air drawn by the engine).

When a sudden, quick request of considerable increase of the driving torque or power occurs [i.e., when the driver strongly pushes onto the accelerator pedal (for example, for overtaking)] from a moderate "driving torque" or "power" condition (low rotational speeds and controlled speeds), a quite obvious turbo-lag is usually present. This phenomenon known as "turbo-lag" or "turbo response" represents the tendency of the engines provided with turbocharger to be lacking in power response upon the quick actuation of the accelerator control and is particularly annoying in the case of applications on sport cars in which the turbocharger-supercharging system allows high performance to be achieved.

The turbo-lag is mainly caused by the inertia moment of the rotor that occurs upon a sudden, quick request for a higher driving torque or power and due to the fact that the overall volume of the circuit located downstream of the compressor must increase the pressure therein.

Several solutions have been proposed over the years in an attempt to reduce the turbo-lag and further improve the performance of the engines provided with turbocharger. A variable-geometry turbocharger or a turbocharger including a plurality of turbines in a configuration in series or in parallel, etc. may be used, for example. However, all the solutions known so far are particularly disadvantageous in terms of costs and overall dimensions.

For example, US2007101977 describes a method for controlling an internal-combustion engine including the steps of determining, in operation, a value of the driving torque requested to the internal-combustion engine and determining the first time derivative of the value of the driving torque requested to the internal-combustion engine.

On the other hand, DE10257061 describes a method for controlling an internal-combustion engine including the steps of determining a value of the driving torque requested to the internal-combustion engine through the accelerator-pedal-position signal.

US2006196183 describes a method for controlling an internal-combustion engine including the steps of: determining, in a preliminary adjustment and set-up step, a number of threshold values; determining, in operation, the first time derivative of the value of the driving torque requested to the internal-combustion engine by comparing the signal related to the accelerator-pedal position in two consecutive time instants; comparing the first time derivative of the value of the driving torque requested to the internal-combustion engine with a threshold value; and controlling the internal-combustion engine as a function of the result of the comparison of the first time derivative of the value of the driving torque requested to the internal-combustion engine with the threshold value.

US2008300768 describes a method for controlling an internal-combustion engine in which, through a "manettino" dial, the driver can select the desired driving mode from three possible driving modes, including a "sport driving" mode (which is characterized by a quicker response to the driver's requests on the accelerator pedal). The control method provides for: determining, in a preliminary adjustment and set-up step, a first threshold value; determining, in operation, the first time derivative of the value of the driving torque requested to the internal-combustion engine; comparing the first time derivative of the value of the driving torque requested to the internal-combustion engine with the first threshold value; and controlling the internal-combustion engine as a function of the result of the comparison of the first time derivative of the value of the driving torque requested to the internal-combustion engine with the first threshold value.

However, all the solutions known so far are particularly disadvantageous in terms of costs and overall dimensions and do not allow an optimal management of the internal-combustion engine, especially in cases of a "sport driving" condition. The object of the invention is to provide a method for controlling an internal-combustion engine that is easy and cost-effective to be implemented.

SUMMARY OF INVENTION

The invention overcomes the disadvantages in the related art in a method for controlling an internal-combustion engine. The method comprises steps of: determining, in a preliminary adjustment and set-up step, a number of threshold values; recognizing a selection of a user to enable a "sport driving" condition that favors performance of the internal-combustion engine; determining, in operation, a value of driving torque requested to the internal-combustion engine; determining a first time derivative of the value of the driving torque; comparing the value of the driving torque with a first threshold value that is variable as a function of a series of parameters; comparing the first time derivative with a second threshold value that is variable as a function of a series of parameters; enabling the "sport driving" condition only if the value of the driving torque is higher than the first threshold value and the first time derivative is higher than the second threshold value; and controlling the internal-combustion engine as a function of the "sport driving" condition.

An advantage of the invention is that it provides a method for controlling an internal-combustion engine that is easy and cost-effective to be implemented.

Other objects, features, and advantages of the control method of the invention are readily appreciated as the control method becomes more understood while the subsequent detailed description of at least one non-limiting embodiment of the control method is read taken in conjunction with the accompanying drawing thereof.

BRIEF DESCRIPTION OF FIGURE OF DRAWING OF INVENTION

FIG. 1 diagrammatically shows an embodiment of an internal-combustion engine supercharged by a turbocharger and provided with an electronic-control unit that implements a control method according to the invention.

DETAILED DESCRIPTION OF EMBODIMENT(S) OF INVENTION

FIG. 1 generally indicates at 1 an internal-combustion engine supercharged by a turbocharger-supercharging system 2.

The internal-combustion engine 1 includes four cylinders 3 each of which is connected to an intake manifold 4 by at least one respective intake valve (not shown) and to an exhaust manifold 5 by at least one respective exhaust valve (not shown). The intake manifold 4 receives fresh air (i.e., air from the external environment) through an intake conduit 6, which is provided with an air filter 7 and is adjusted by a throttle valve 8. An intercooler 9 serving the function of cooling the air drawn is arranged along the intake conduit 6. An exhaust conduit 10 is connected to the exhaust manifold 5 and feeds the exhaust gases produced by the combustion to an exhaust system, which emits the gases produced by the combustion to the atmosphere and usually includes at least one catalyzer 11 and at least one silencer (not shown) arranged downstream of catalyzer 11.

The supercharging system 2 of the internal-combustion engine 1 includes a turbocharger 12 provided with a turbine 13 (which is arranged along the exhaust conduit 10 to rotate at a high speed under the action of the exhaust gases ejected by cylinders 3) and a compressor 14 (which is arranged along the intake conduit 6 and is mechanically connected to turbine 13 to be rotated by the turbine 13 itself to increase the pressure of the air fed into the feeding conduit 6).

A bypass conduit 15 is provided along the exhaust conduit 10 and connected in parallel to turbine 13 to have its ends connected upstream and downstream of the turbine 13 itself. A waste-gate valve 16 is arranged along the bypass conduit 15, adapted to adjust the flow rate of the exhaust gases flowing through the bypass conduit 15, and driven by an actuator 17. A bypass conduit 18 is provided along the exhaust conduit 6 and connected in parallel to compressor 14 to have its ends connected upstream and downstream of compressor 14 itself. A Poff valve 19 is arranged along the bypass conduit 18, adapted to adjust the flow rate of the air flowing through the bypass conduit 18, and driven by an actuator 20.

The above description explicitly refers to an internal-combustion engine 1 supercharged by a turbocharger 12. As an alternative, the above-described control method may be advantageously applied in any internal-combustion engine supercharged by a dynamic compressor, for example.

According to an embodiment, the internal-combustion engine 1 is provided with an electric machine mechanically connected to turbocharger 12 and arranged for recovering the exhaust gas energy. According to this embodiment, delivering the required driving torque by absorbing electric energy and braking by delivering electric energy are both possible.

As an alternative, the control method described hereinafter may be applied to a supercharged internal-combustion engine of the type described in EP-A1-2096277 and including a turbine, a compressor mechanically independent of the turbine, an electric generator rotated by the turbine for generating electric current, and an electric motor that rotates the compressor.

In general, the above-described embodiments have in common the fact that they have an air volume between compressor 14 and cylinders 3. The air mass trapped in each cylinder 3 for each engine cycle may be adjusted by the respective intake valve (not shown) by a valve-actuation device with variable-opening law, such as an electromagnetic or electrohydraulic cam-less device. Alternatively, the air mass trapped in each cylinder 3 for each engine cycle is adjusted by the interposition of a valve 27 (in an embodiment, a throttle valve) between compressor 14 and the intake valves. As a further alternative, both a valve-actuation device with variable-opening law and the insertion of a valve 27 (in an embodiment, a throttle valve) between compressor 14 and the intake valves may be provided.

The internal-combustion engine 1 is controlled by an electronic-control unit 21, which supervises the operation of all the components of the internal-combustion engine 1, including the supercharging system 2. In particular, the electronic-control unit 21 drives the actuators 17, 20 of waste-gate valve 16 and Poff valve 19. The electronic-control unit 21 is connected to sensors 22 that measure temperature To and pressure Po along the intake conduit 6 upstream of compressor 14 to sensors 23 that measure temperature and pressure along the intake conduit 6 upstream of the throttle valve 8 and to sensors 24 that measure temperature and pressure into the intake manifold 4. Moreover, the electronic-control unit 21 is connected to a sensor 25 that measures the angular position (and, thus, the rotation speed) of a drive shaft of the internal-combustion engine 1 and to a sensor 26 that measures the phase of the intake and/or exhaust valves. It is also worth noting that sensors adapted to measure the rotation speed of turbocharger 12 are not required.

The "control" mode used by the electronic-control unit 21 for controlling the supercharged internal-combustion engine 1 is described below. In particular, the electronic-control unit 21 is set-up for recognizing (i.e., enabling and disabling) a "sport driving" condition and for controlling the internal-combustion engine 1 as a function of the successful recognition of the "sport driving" condition.

The algorithm implemented by the electronic-control unit 21 for enabling the "sport driving" condition is described hereinafter. The "sport driving" condition is enabled as a function of a plurality of parameters.

Firstly, enabling the "sport driving" condition depends on the position taken by the "manettino" dial (where provided) that determines the operating mode selected by the driver of the vehicle accommodating the supercharged internal-combustion engine 1. In particular, according to an embodiment, a "sport operating" mode and a standard operating mode may be differentiated. The "sport operating" mode typically favors the performance while the standard operating mode favors a reduction of consumptions. The electronic-control unit 21 is obviously set-up for enabling the "sport driving" condition only when the "sport operating" mode is selected by the driver over the standard operating mode, which favors a reduction of consumptions.

According to a further embodiment that is typical of applications on sport cars, the driver can select from a number of different positions of the "manettino" dial that correspond to operating conditions that favor a reduction of consumptions or the performance. The electronic-control unit 21 is obviously set-up for enabling the "sport driving" condition only when an operating mode that favors the performance over the consumptions is selected by the driver from the different operating modes available.

The electronic-control unit 21 is implemented for disabling the "sport driving" condition as soon as the standard operating mode that favors a reduction of consumptions is selected by the driver. In other words, as soon as the electronic-control unit 21 recognizes that the driver has shifted the "manettino" dial from the "sport operating" mode to the standard operating mode (or, as an alternative, from one of the "sport operating" modes that favor a reduction of consumptions to one of the operating modes that favor the performance), the "sport driving" condition is disabled.

Moreover, in a preliminary step of adjusting and setting up the electronic-control unit 21, a first threshold value S1 is also determined.

According to an embodiment, the first threshold value S1 may be calibrated and is variable as a function of a series of parameters (such as revolutions per minute, etc.).

In the preliminary step of adjusting and setting up the electronic-control unit 21, a second threshold value S2 is also determined.

According to an embodiment, the second threshold value S2 may be calibrated and is variable as a function of a series of parameters (such as revolutions per minute, etc.).

In operation, the electronic-control unit 21 is connected to the accelerator pedal and is set-up for acquiring the value of driving torque C requested by the driver by the accelerator pedal. Moreover, the electronic-control unit 21 is set-up for calculating the first time derivative $\dot{C}$ of the value of the driving torque requested by the driver by the accelerator pedal.

Once this phase has been reached, the value of driving torque C requested by the driver by the accelerator pedal and the first time derivative $\dot{C}$ of the value of the driving torque requested by the driver by the accelerator pedal are compared with the first threshold value S1 and with the second threshold value S2, respectively.

In particular, the value of driving torque C requested by the driver by the accelerator pedal must be higher than the first threshold value S1 while the first time derivative $\dot{C}$ of the value of the driving torque requested by the driver by the accelerator pedal must be higher than the second threshold value S2. In other words, the electronic-control unit 21 is set-up for enabling the "sport driving" condition only if the comparison of the value of driving torque C requested by the driver by the accelerator pedal and of the first time derivative $\dot{C}$ of the value of the driving torque requested by the driver by the accelerator pedal with the first threshold value S1 and with the second threshold value S2, respectively, gives a positive result—that is, the current value of driving torque C requested by the driver is higher than (or equal to) the first threshold value S1 and the current value of the first time derivative $\dot{C}$ of the value of the driving torque requested by the driver is higher than (or equal to) the second threshold value S2.

The enabling conditions described so far and related to the comparisons for the value of driving torque C requested by the driver and for the first time derivative $\dot{C}$ of the value of the driving torque requested by the driver must all be met at the same time. If the vehicle is also provided with the "manettino" dial for selecting the operating mode, the condition related to the position of the "manettino" dial itself must also be met.

Moreover, the enabling conditions must be kept by such a time interval to allow the reliability and sturdiness of the above conditions to be checked. In a preliminary adjustment and set-up step, a checking-time interval $\Delta t$ is determined having a predetermined and time-course-variable duration as a function of a series of parameters and a number N of checking tests that is time-course variable as a function of a series of parameters (such as the vehicle age, etc.).

The above-described enabling conditions must be checked a number of times that is at least equal to the number N of checking tests within a time interval that lasts as long as the checking-time interval $\Delta t$ for the electronic-control unit 21 to proceed with enabling the "sport driving" condition.

According to an embodiment, in a preliminary adjustment and set-up step, a safety time interval $\Delta ts$ is also determined having a predetermined and time-course-variable duration as a function of a series of parameters (such as the vehicle age, etc.). The above-described enabling conditions must be checked a number of times that is at least equal to the number N of checking tests and spaced apart by a time interval lasting at least as long as the safety time interval $\Delta ts$.

Thereby, when the driver pushes on the accelerator pedal when exiting a bend to request a higher driving torque to engage the subsequent straight road in a determined manner, but for a relatively limited time interval, enabling the "sport driving" condition without an actual need thereof may be prevented.

The operation with the recognizer serves for implementing racier strategies all the time a highly sport drive is desired. The strategies determine such dedicated operating modes in stationary condition to allow a subsequent, more dynamic transient condition.

Moreover, the electronic-control unit 21 is set-up for checking a number of conditions related to the state of the internal-combustion engine 1 for enabling the "sport driving" condition.

In particular, in a preliminary step of adjusting and setting up the electronic-control unit 21, a third threshold value S3 (expressed in ° C.) is also determined.

In the preliminary step of adjusting and setting up the electronic-control unit 21, a fourth threshold value S4 (expressed in ° C. as well) is also determined.

In operation, the electronic-control unit 21 is connected to a number of sensors that are set-up for reading the current temperature of the control fluid and the current temperature of the water of the internal-combustion engine 1 and for transmitting a signal to the electronic-control unit 21.

The current temperature of the control fluid and the current temperature of the water of the internal-combustion engine 1 are then compared with the third threshold value S3 and with the fourth threshold value S4, respectively.

In particular, the current temperature of the control fluid must be higher than the third threshold value S3 while the current temperature of the water must be higher than the fourth threshold value S4. In other words, the electronic-control unit 21 is set-up for enabling the "sport driving" condition only if the comparison of the current temperature of the control fluid and of the current temperature of the water of the internal-combustion engine 1 with the third threshold value S3 and with the fourth threshold value S4, respectively, has given a positive result. When the current temperature of the control fluid is higher than (or equal to) the third threshold value S3 and the current temperature of the water is higher than (or equal to) the fourth threshold value S4, this substantially means that the internal-combustion engine 1 is sufficiently hot to also withstand a "sport driving" operation, thus favoring the performance.

The enabling conditions related to the state of the internal-combustion engine 1 (related to the temperature of the control fluid and to the temperature of the water of the internal-combustion engine 1) must be met at the same time as the above-described enabling conditions related to the position of the "manettino" dial (where provided) and to the comparisons for the value of driving torque C requested by the driver and for the first time derivative $\dot{C}$ of the value of the driving torque requested by the driver.

The algorithm implemented by the electronic-control unit 21 for disabling the "sport driving" condition is described hereinafter.

Firstly, disabling the "sport driving" condition depends on the position taken by the "manettino" dial (where provided) that determines the operating mode selected by the driver of the vehicle. The electronic-control unit 21 is obviously set-up for disabling the "sport driving" condition as soon as the standard operating mode is selected by the driver (which mode favors a reduction of consumptions) over the "sport operating" mode. In other words, as soon as the electronic-control unit 21 recognizes that the driver has shifted the "manettino" dial from the "sport operating" mode to the standard operating mode (or, more generally, from one of the operating modes that favor the performance to one of the operating modes that favor a reduction of consumptions), the "sport driving" condition is disabled.

According to a further embodiment, in a preliminary step of adjusting and setting up the electronic-control unit 21, a fifth threshold value S5 is determined.

According to an embodiment, the fifth threshold value S5 may be calibrated and is variable as a function of a series of parameters (such as revolutions per minute, the current gear engaged by the vehicle, etc.).

In operation, the electronic-control unit 21 is connected to the accelerator pedal and is set-up for acquiring the value of driving torque C requested by the driver by the accelerator pedal. Moreover, the electronic-control unit 21 is set-up for calculating the first time derivative $\dot{C}$ of the value of the driving torque requested by the driver by the accelerator pedal and the absolute value $|\dot{C}|$ of the first time derivative of the value of the driving torque requested by the driver by the accelerator pedal.

Once this phase has been reached, the absolute value $|\dot{C}|$ of the first time derivative of the driving torque requested by the driver by the accelerator pedal is compared with the fifth threshold value S5.

In particular, the absolute value $|\dot{C}|$ of the first time derivative of the driving torque requested by the driver by the accelerator pedal must be lower than the fifth threshold value S5. The electronic-control unit 21 is set-up for disabling the "sport driving" condition if the comparison of the absolute value $|\dot{C}|$ of the first time derivative of the driving torque requested by the driver with the fifth threshold value S5 gives a positive result.

Moreover, the above disabling condition must be kept by such a time interval to allow the reliability and sturdiness of the above condition to be checked. In a preliminary adjustment and set-up step, a checking-time interval Δt2 is then determined having a predetermined and time-course variable duration as a function of a series of parameters.

The disabling condition related to the absolute value $|\dot{C}|$ of the first time derivative of the driving torque requested by the driver must be checked by a time interval lasting longer than the checking-time interval Δt2 for the electronic-control unit 21 to proceed with disabling the "sport driving" condition.

In other words, in case of instant (or having a limited time-course duration) and particularly sudden reductions of the driving torque requested by the driver, the "sport driving" condition is not immediately disabled, but only if the reduction lasts by a time interval lasting longer than the checking-time interval Δt2.

According to a further embodiment, an optional further disabling condition may be added. In particular, in a preliminary step of adjusting and setting up the electronic-control unit 21, a sixth threshold value S6 is also determined.

According to an embodiment, the sixth threshold value S6 may be calibrated and is variable as a function of a series of parameters (such as revolutions per minute, the current gear engaged by the vehicle, etc.).

In operation, the electronic-control unit 21 connected to the accelerator pedal is set-up for acquiring the value of driving torque C requested by the driver by the accelerator pedal.

In operation, the value of driving torque C requested by the driver by the accelerator pedal (or the power, in the alternative) is compared with the sixth threshold value S6. The value of driving torque C requested by the driver by the accelerator pedal must be lower than the sixth threshold value S6. In other words, the electronic-control unit 21 is set-up for disabling the "sport driving" condition if the comparison of the absolute value $|\dot{C}|$ of the first time derivative of the driving torque requested by the driver and simultaneously of the value of the driving torque C requested by the driver (by the accelerator pedal) with the fifth threshold value S5 and with the sixth threshold value S6, respectively, gives a positive result.

Moreover, both the disabling conditions must be kept by such a time interval to allow the reliability and sturdiness of the above conditions to be checked. The disabling conditions related to both the absolute value $|\dot{C}|$ of the first time derivative of the driving torque requested by the driver and to the value of driving torque C requested by the driver must be checked by a time interval lasting longer than the checking-time interval Δt2 for the electronic-control unit 21 to proceed with disabling the "sport driving" condition.

According to an embodiment, the duration of the checking-time interval Δt is different than (in particular, longer than) the duration of the checking-time interval Δt2.

According to another embodiment, the duration of the checking-time interval Δt is equal to the duration of the checking-time interval Δt2.

According to an embodiment, the fifth threshold value S5 is different than the second threshold value S2.

According to another embodiment, the fifth threshold value S5 is equal to the second threshold value S2.

According to an embodiment, the sixth threshold value S6 is different than the first threshold value S1.

According to another embodiment, the sixth threshold value S6 is equal to the first threshold value S1.

During all of the time interval in which the electronic-control unit 21 enables the "sport driving" condition, the supercharged internal-combustion engine 1 is controlled as a function of the "sport driving" condition itself.

In particular, the "sport drive" is enabled to implement a number of engine-control strategies that are implemented in the electronic-control unit 21 itself and are adapted to improve the performance of the supercharged internal-combustion engine 1. An increase of the maximum driving torque that can be delivered, an increase of the maximum power, etc. may be contemplated, for example.

To better understand some of the above-mentioned strategies, explicit reference is made to the description in EP-B1-1741895, EP-B1-2014894, BO02010A000579, BO20110A000604, BO02010A000605, and BO2011 A000400.

The above description explicitly refers to an internal-combustion engine supercharged by a turbocharger 12. However, it is obvious that the control method described so far is advantageously applied in any type of internal-combustion engine 1.

The above-described control method of the internal-combustion engine 1 has some advantages. In particular, the control method is simple and cost-effective to be implemented in an electronic-control unit 21 of a supercharged internal-combustion engine 1 as it does not require hardware modifications, a high computational capability, or a large memory usage while allowing the performance of the internal-combustion engine 1 supercharged by turbocharger 12 to be improved.

It should be appreciated by those having ordinary skill in the related art that the control method of the invention has been described above in an illustrative manner. It should be so appreciated also that the terminology that has been used above is intended to be in the nature of words of description rather than of limitation. It should be so appreciated also that many modifications and variations of the control method are possible in light of the above teachings. It should be so appreciated also that, within the scope of the appended claims, the control method may be practiced other than as specifically described above.

What is claimed is:

1. A method for controlling an internal-combustion engine (1), the method comprising steps of:
   determining, in a preliminary adjustment and set-up step, a number of threshold values (S1, S2, S3, S4, S5, S6);
   recognizing a selection of a user to enable a "sport driving" condition that favors performance of the internal-combustion engine;
   determining, in operation, a value of driving torque (C) requested to the internal-combustion engine (1);
   determining a first time derivative ($\dot{C}$) of the value of the driving torque (C);
   comparing the value of the driving torque (C) with a first threshold value (S1) that is variable as a function of a series of parameters;
   comparing the first time derivative ($\dot{C}$) with a second threshold value (S2) that is variable as a function of a series of parameters;
   enabling the "sport driving" condition only if the value of the driving torque (C) is higher than the first threshold value (S1) and the first time derivative ($\dot{C}$) is higher than the second threshold value (S2); and
   controlling the internal-combustion engine (1) as a function of the "sport driving" condition.

2. The control method according to claim 1, wherein the method comprises further steps of:
   determining, in a preliminary adjustment and set-up step, a first checking-time interval ($\Delta t$) and a number (N) of checking tests;
   enabling the "sport driving" condition only if the value of the driving torque (C) is higher than the first threshold value (S1) for a number of times that is at least equal to the number (N) of checking tests and within a time interval that lasts at least as long as the first checking-time interval ($\Delta t$) and the first time derivative ($\dot{C}$) is higher than the second threshold value (S2) for a number of times that is at least equal to the number (N) of checking tests and within a time interval that lasts at least as long as the first checking-time interval ($\Delta t$); and
   controlling the internal-combustion engine (1) as a function of the "sport driving" condition.

3. The control method according to claim 2, wherein the method comprises further steps of:
   determining, in a preliminary adjustment and set-up step, a first safety time interval ($\Delta t_s$);
   enabling the "sport driving" condition only if the value of the driving torque (C) is higher than the first threshold value (S1) for a number of times, spaced apart by a time interval lasting at least as long as the first safety time interval ($\Delta t_s$), that is at least equal to the number (N) of checking tests and within a time interval that lasts at least as long as the first checking-time interval ($\Delta t$) and the first time derivative ($\dot{C}$) is higher than the second threshold value (S2) for a number of times, spaced apart by a time interval lasting at least as long as the first safety time interval ($\Delta t_s$), that is at least equal to the number (N) of checking tests and within a time interval that lasts at least as long as the first checking-time interval ($\Delta t$); and
   controlling the internal-combustion engine (1) as a function of the "sport driving" condition.

4. The control method according to claim 1, wherein the method comprises further steps of:
   determining, in operation, a current temperature of a control fluid and a current temperature of a cooling fluid of the internal-combustion engine (1);
   comparing the current temperature of the control fluid and the current temperature of the cooling fluid of the internal-combustion engine (1) with a third threshold value (S3) and a fourth threshold value (S4), respectively;
   enabling the "sport driving" condition only if the current temperature of the control fluid is higher than the third threshold value (S3) and the current temperature of the cooling fluid is higher than the fourth threshold value (S4); and
   controlling the internal-combustion engine (1) as a function of the "sport driving" condition.

5. The control method according to claim 1, wherein the method comprises further steps of:
   determining an absolute value ($|\dot{C}|$) of the first time derivative ($\dot{C}$);
   comparing the absolute value ($|\dot{C}|$) with a fifth threshold value (S5); and
   disabling the "sport driving" condition if the absolute value ($|\dot{C}|$) is lower than the fifth threshold value (S5).

6. The control method according to claim 1, wherein the method comprises further steps of:
   comparing either of the value of the driving torque (C) and a value of power requested to the internal-combustion engine (1) with a sixth threshold value (S6); and
   disabling the "sport driving" condition if the value of either of the driving torque (C) and the power is lower than the sixth threshold value (S6).

7. The control method according to claim 6, wherein the method comprises further steps of:
   determining, in a preliminary adjustment and set-up step, a second checking-time interval ($\Delta t2$); and
   disabling the "sport driving" condition only if any of the absolute value ($|\dot{C}|$), the value of the driving torque (C), and the power is lower, respectively, than either of the fifth threshold value (S5) and the sixth threshold value (S6) for a time interval lasting at least as long as the second checking-time interval ($\Delta t2$).

8. The control method according to claim 1, wherein the method comprises further steps of:
   selecting either of a "sport operating" mode that favors the performance and a standard operating mode that favors a reduction of consumptions; and
   disabling the "sport driving" condition as soon as the standard operating mode is selected.

9. The control method according to claim 1, wherein the threshold values (S1, S2, S3, S4, S5, S6) are different from one another and variable as a function of a plurality of parameters.

10. The control method according to claim 7, wherein a duration of the first checking-time interval ($\Delta t$) is longer than a duration of the second checking-time interval ($\Delta t2$).

11. The control method according to claim 1, wherein the internal-combustion engine (1) is supercharged by a turbocharger (12) provided with a turbine (13) and a compressor (14).

* * * * *